United States Patent [19]

Aldrich et al.

[11] Patent Number: 5,017,252

[45] Date of Patent: May 21, 1991

[54] METHOD FOR FABRICATING INSULATING GLASS ASSEMBLIES

[75] Inventors: Darrell L. Aldrich, Sellersville, Pa.; John R. Jacobs, Madison, Wis.

[73] Assignee: Interpane Coatings, Inc., Deerfield, Wis.

[21] Appl. No.: 536,509

[22] Filed: Jun. 12, 1990

Related U.S. Application Data

[63] Continuation of Ser. No. 280,773, Dec. 6, 1988, abandoned.

[51] Int. Cl.[5] .......................... C03C 27/06; E06B 3/66

[52] U.S. Cl. .................................... 156/109; 156/104; 156/286; 156/382; 428/34; 52/788; 52/790

[58] Field of Search ............... 156/104, 109, 286, 382; 52/788, 790; 428/34

[56] References Cited

U.S. PATENT DOCUMENTS

| | | | |
|---|---|---|---|
| 1,591,932 | 7/1926 | Young . | |
| 1,770,380 | 7/1930 | Young . | |
| 2,016,045 | 10/1935 | Munters . | |
| 2,066,356 | 1/1937 | McCrosson . | |
| 2,213,395 | 9/1940 | Hopfield . | |
| 2,398,371 | 4/1946 | Gerspacher . | |
| 2,565,937 | 8/1951 | Verhagen . | |
| 2,618,819 | 11/1952 | Goodwillie . | |
| 2,667,951 | 2/1954 | Gall . | |
| 2,708,774 | 5/1955 | Seelen . | |
| 2,756,467 | 7/1956 | Etling . | |
| 2,875,792 | 3/1959 | Moyer . | |
| 2,918,708 | 12/1959 | Sharp et al. . | |
| 3,128,509 | 4/1964 | Stotz . | |
| 3,183,560 | 5/1965 | Brichard . | |
| 3,212,179 | 10/1965 | Koblensky . | |
| 3,397,278 | 8/1968 | Pomerantz . | |
| 3,417,459 | 12/1968 | Pomerantz et al. . | |
| 3,544,294 | 12/1970 | Goto . | |
| 3,598,518 | 8/1971 | Goto . | |
| 3,683,974 | 8/1972 | Stewart et al. . | |
| 3,685,239 | 8/1972 | McCurdy | 156/109 |
| 3,781,003 | 12/1973 | DeAngelis . | |
| 3,842,567 | 10/1974 | Zwart et al. . | |
| 3,911,245 | 10/1975 | O'Shaughnessy . | |
| 3,932,971 | 1/1976 | Day . | |
| 4,125,390 | 11/1978 | Kawai et al. . | |
| 4,157,140 | 6/1979 | Glasgow . | |
| 4,268,553 | 5/1981 | Marzouki et al. . | |
| 4,335,166 | 6/1982 | Lizardo et al. . | |
| 4,369,084 | 1/1983 | Lisec . | |
| 4,393,105 | 7/1983 | Kreisman | 156/104 |
| 4,495,023 | 1/1985 | Lisec . | |
| 4,708,762 | 11/1987 | Lenhardt . | |
| 4,780,164 | 10/1988 | Rueckheim et al. | 156/104 |

FOREIGN PATENT DOCUMENTS

| | | |
|---|---|---|
| 56762 | 7/1982 | European Pat. Off. . |
| 269194 | 6/1988 | European Pat. Off. . |
| 3402323 | 8/1985 | Fed. Rep. of Germany . |
| 2344700 | 10/1977 | France . |
| 2442948 | 6/1980 | France . |
| 2065756 | 4/1983 | United Kingdom . |

*Primary Examiner*—Caleb Weston
*Assistant Examiner*—Francis Lorin
*Attorney, Agent, or Firm*—Michael, Best & Friedrich

[57] ABSTRACT

A method for fabricating a plurality of insulating glass assemblies, the method comprising the steps of providing a plurality of glass assemblies each including a pair of generally parallel, spaced glass panes having therebetween an endless spacer, the spacer and the panes defining an interior space between the panes and inside the spacer, and the spacer having therethrough a tortuous passage affording gas flow into and out of the space, placing the glass assemblies in a chamber, creating a vacuum in the chamber so as to remove substantially all of the air from the spaces, introducing into the chamber a gas having a coefficient of thermal conductivity lower than that of air so that the gas fills the spaces, removing the glass assemblies from the chamber, and closing the passages in the spacers.

16 Claims, 1 Drawing Sheet

METHOD FOR FABRICATING INSULATING GLASS ASSEMBLIES

RELATED APPLICATION

This is a continuation of application Ser. No. 280,773 which was filed on Dec. 6, 1988 now abandoned.

BACKGROUND OF THE INVENTION

The invention relates to methods for fabricating insulating glass assemblies, and more particularly to methods for filling the spaces between the panes of glass assemblies with gas.

A conventional insulating glass assembly includes a pair of generally parallel, spaced glass panes defining therebetween a space and having therebetween an endless spacer. A typical spacer is made of extruded metal, is rectangular in cross section and has a hollow interior. The inner wall of the spacer has therein a plurality of holes or perforations, and the spacer has within its interior a desiccant that absorbs moisture from the gas within the space between the panes. The spacer is bonded to the panes by a suitable material such as polyisobutylene.

Various methods are known for replacing air in the space between the panes with a gas having a coefficient of thermal conductivity lower than that of air. U.S. Pat. No. 4,780,164 discloses a method in which a plurality of insulating glass assemblies are arranged with their panes extending in parallel, vertical planes and are placed within a vacuum chamber. Each of the glass assemblies has an opening in its spacer. The chamber is evacuated, so that the spaces between the panes of the glass assemblies are evacuated, and the chamber is then filled with a gas having a coefficient of thermal conductivity lower than that of air, so that the spaces between the panes of the glass assemblies are filled with gas. Finally, the assemblies are removed from the chamber and the openings in the spacers are sealed.

It is commonly believed that it is necessary to have the glass assemblies oriented vertically within the vacuum chamber and to have the openings located in the tops of the glass assemblies so that the gas does not leak out of the glass assemblies before the openings in the spacers are sealed.

SUMMARY OF THE INVENTION

The method described in U.S. Pat. No. 4,780,164 is inconvenient and inefficient because the normal manufacturing steps before and after the above-described gas filling step require the glass assemblies to be stacked in horizontal planes. Prior to the gas filling step, the panes are sealed to the spacers. After the gas filling step, a secondary sealant is applied around the spacers. See, for example, U.S. Pat. No. 2,966,435. These two steps normally require the glass assemblies to be stacked horizontally.

The invention provides a manufacturing process in which the glass assemblies are stacked in horizontal planes during all three of the above-described steps. The process comprises the following steps: assembling a plurality of glass assemblies so as to form a stack of horizontally oriented assemblies, moving the stack of horizontally oriented assemblies into a vacuum chamber, evacuating the vacuum chamber, filling the chamber with a suitable gas so that the air inside the glass assemblies is replaced by the gas, moving the stack out of the vacuum chamber, sealing the passages in the spacers of the glass assemblies while the assemblies remain horizontally stacked, and applying a secondary sealant to the glass assemblies while the assemblies remain horizontally stacked.

The invention recognizes that the glass assemblies can be stacked horizontally in the vacuum chamber, without undesirable leakage of gas after removal of the glass assemblies from the vacuum chamber, if each glass assembly has, instead of a conventional direct passage or opening, a tortuous or labyrinthine or baffled or restricted passage communicating between the interior and the exterior of the glass assembly. The tortuous passage restricts or baffles the gas flow out of the glass assembly so that any gas leakage after removal of the glass assembly from the vacuum chamber is negligible.

The tortuous passage can take many suitable forms. In one embodiment of the invention, the tortuous passage includes the perforations in the inner wall of the spacer and an opening in the outer wall of the spacer. The opening has an area substantially greater than the area of any one of the perforations. In another embodiment of the invention, the tortuous passage includes a first opening in the inner wall of the spacer and a second opening in the outer wall of the spacer, with the second opening having an area substantially equal to the area of the first opening and being spaced from the first opening in the direction of the longitudinal axis of the spacer.

The horizontal orientation of the glass assemblies also permits the chamber to be evacuated more rapidly than is possible if the assemblies are oriented vertically, because the weight of each pane and the weight of any assembly or assemblies supported by the pane resist outward bowing of the pane. As explained in U.S. Pat. No. 4,780,164, which is incorporated herein by reference, the panes tend to bow outwardly as the chamber is evacuated because the pressure inside the interior space decreases more slowly than the pressure within the remainder of the vacuum chamber. The weight of the panes will not resist outward bowing of the panes when the assemblies are oriented vertically. U.S. Pat. No. 4,780,164 seeks to solve this problem (see Col. 5, lines 39–43) by placing a heavy metal plate against the outermost pane of a stack of vertical panes. The process provided by the invention does not require the application of pressure to the stack of glass assemblies and therefore eliminates the need for such a plate.

Thus, the invention provides a manufacturing process that is substantially more efficient than known prior art processes because the glass assemblies remain in a horizontal stack from the beginning of the process to the end of the process.

Other features and advantages of the invention will become apparent to those skilled in the art upon review of the following detailed description, claims and drawings.

Figure 1:
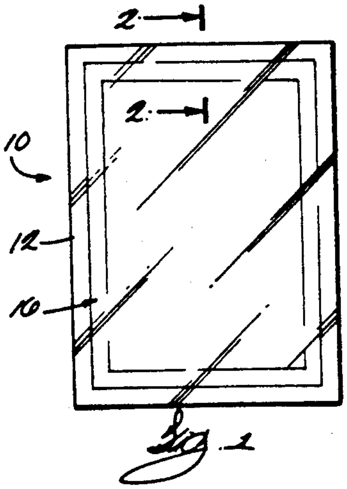
FIG. 1 is a plan view of a horizontally oriented glass assembly.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

An insulating glass assembly 10 embodying the invention is illustrated in FIGS. 1—4. The assembly 10 comprises upper and lower generally parallel, generally rectangular, spaced glass panes 12 and 14, respectively. The assembly 10 also comprises an endless spacer 16 located between the panes 12 and 14 and adjacent, but spaced inwardly from, the periphery of the panes 12 and 14.

Figure 2:
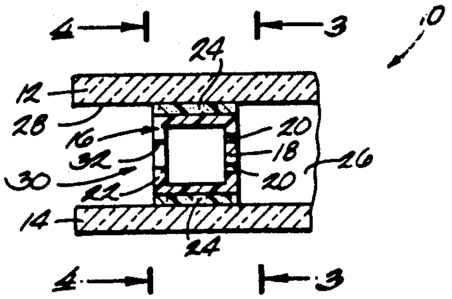
FIG. 2 is a view taken along line 2—2 in FIG. 1.
Figure 3:
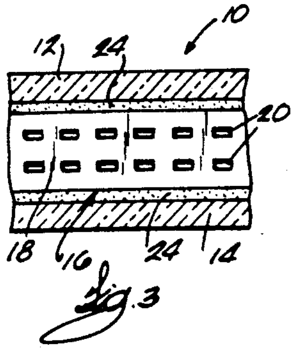
FIG. 3 is a view taken along line 3—3 in FIG. 2.
Figure 4:
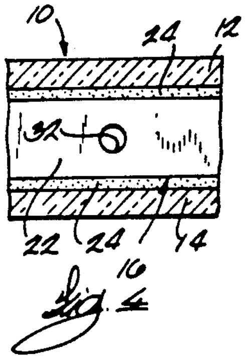
FIG. 4 is a view taken along line 4—4 in FIG. 2.

The spacer 16 is preferably made of extruded metal and, as shown in FIG. 2, is rectangular in cross section and has a hollow interior. The spacer 16 includes an inner wall 18 having therein two rows of generally rectangular holes or perforations 20. The spacer 16 also includes an outer wall 22 spaced from the inner wall 18. At least a portion of the spacer 16 has within its interior a desiccant (not shown) that absorbs moisture from the below-described interior space between the panes 12 and 14.

The spacer 16 is bonded to each of the panes 12 and 14 by a suitable material or primary sealant 24 such as polyisobutylene. The spacer 16 and the panes 12 and 14 define, between the panes 12 and 14, an interior space 26 inside the spacer 16 and an endless channel 28 outside the spacer 16. The interior space 26 is filled with air when the insulating glass assembly 10 is originally assembled.

The spacer 16 has therethrough (see FIG. 2) a restricted or tortuous or labyrinthine or baffled passage 30 affording gas flow into and out of the interior space 26. In the preferred embodiment, the passage 30 includes the perforations 20, the interior of the spacer 16, and an opening 32 in the outer wall 22 of the spacer 16. The opening 32 has an area substantially greater than the area of any one of the perforations 20. Gas can flow between the exterior of the assembly 10 and the interior of the spacer 16 through the opening 32, and gas can flow between the interior of the spacer 16 and the interior space 26 through the perforations 20. Because the area of each perforation 20 is substantially less than the area of the opening 32, the rate of gas flow through the opening 32 is substantially reduced by the perforations 20. Thus, the perforations 20 retard gas flow into and out of the interior space 26.

Figure 7:
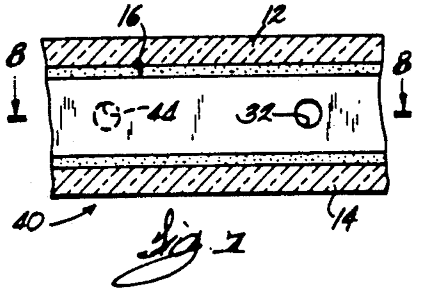
FIG. 7 is a view similar to FIG. 4 and illustrating an alternative embodiment of the invention.
Figure 8:
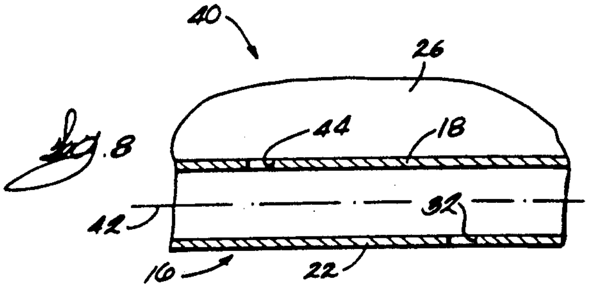
FIG. 8 is a view taken along line 8—8 in FIG. 7.

An alternative glass assembly 40 is illustrated in FIGS. 7 and 8. Except as described hereinafter, the assembly 40 is substantially identical to the assembly 10 of the preferred embodiment, and common elements have been given the same reference numerals. In the alternative assembly 40, the spacer 16 has a longitudinal axis 42 (FIG. 8), and the tortuous passage 30 includes, in addition to or instead of the perforations 20, an opening 44 in the inner wall 18 of the spacer 16. The opening 44 has an area substantially equal to the area of the opening 32 and is spaced in the direction of the longitudinal axis 42 from the opening 32, so that gas cannot flow directly through the spacer 16 from the exterior of the assembly 40 to the interior space 26, but must flow transversely through the interior of the spacer 16 and between the openings 32 and 44. This arrangement also retards gas flow into and out of the interior space 26.

Figure 5:
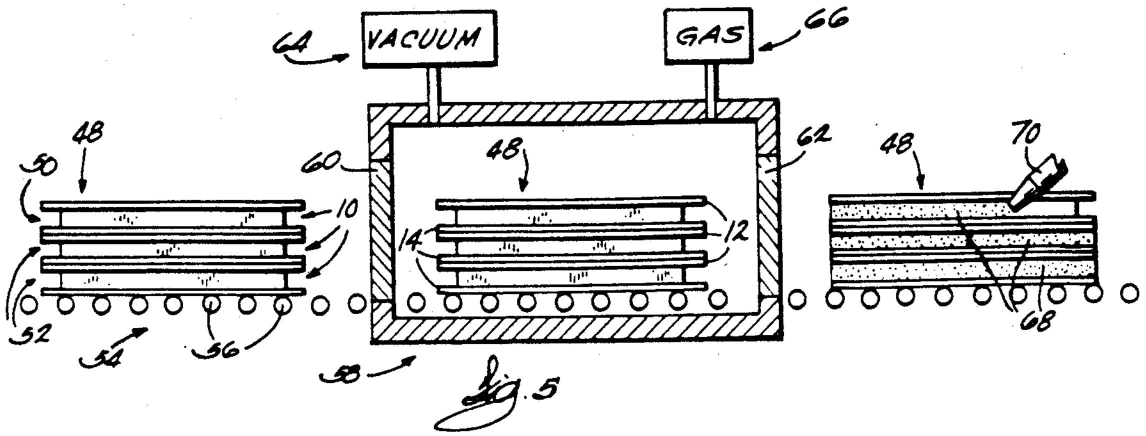
FIG. 5 is a partially schematic view of the manufacturing process of the invention.

A method or process for manufacturing or fabricating a plurality of assemblies is illustrated in FIG. 5. The process is performed as follows.

First, a plurality of glass assemblies 10 are assembled and arranged one on top of another to provide a stack 48 including an uppermost assembly 50 and at least one supporting assembly 52 beneath the uppermost assembly. FIG. 5 shows two supporting assemblies 52 (for a total of three assemblies 10) in each stack 48. The assemblies 10 are arranged with the panes 12 and 14 extending generally horizontally and with the upper pane 12 of each supporting assembly 52 supporting the lower pane 14 of the upwardly adjacent assembly 10. If desired, a suitable separator (not shown) can be placed between adjacent assemblies 10.

In the preferred embodiment, the assemblies 10 are assembled and stacked on a conveyor 54 including a plurality of horizontally disposed rollers 56. As shown in FIG. 5, the conveyor 54 extends through a vacuum chamber 58. The vacuum chamber 58 includes opposed doors 60 and 62, a vacuum pump or other suitable means 64 for creating a vacuum in the chamber 58, and a gas pump or other suitable means 66 for introducing into the chamber 58 a gas, such as argon, having a coefficient of thermal conductivity lower than that of air. Such a vacuum chamber 58 is known in the art and need not be described in further detail.

Next, the stack 48 of assemblies 10 is moved into the chamber 58 (to the right in FIG. 5), and the vacuum pump 64 is operated to create a vacuum in the chamber 58 so as to remove substantially all of the air from the interior spaces 26 of the assemblies 10 within the chamber 58. The gas pump 66 is then operated to introduce the gas into the chamber 58 so that the gas fills the interior spaces 26 of the assemblies 10 within the chamber 58.

Next, the stack 48 of assemblies 10 is moved out of the chamber 58 (to the right in FIG. 5), and the passages 30 in the assemblies 10 are closed while the assemblies 10 remain in the stack 48. More particularly, the openings 32 in the outer walls 22 of the spacers 16 are closed. Any suitable means, such as plugs 67 (FIG. 6), can be used for closing the openings 32.

Figure 6:
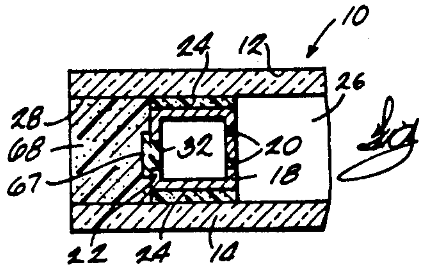
FIG. 6 is a view similar to FIG. 2 and showing the glass assembly after application of a secondary sealant.

Finally, the channels 28 of the assemblies 10 are filled with a suitable secondary sealant 68, such as silicone rubber, while the assemblies 10 remain in the stack 48. The sealant 68 can be applied, for example, with a gun 70. This step of the process is known in the art (see, for example, U.S. Pat. No. 2,966,435, which is incorporated herein by reference) and need not be described in greater detail. An assembly 10 including the secondary sealant 68 is illustrated in FIG. 6.

Various features of the invention are set forth in the following claims.

We claim:

1. A method for fabricating a plurality of insulating glass assemblies, said method comprising the steps of providing a plurality of glass assemblies each including a pair of generally parallel, spaced glass panes having therebetween an endless spacer, said spacer and said panes defining an interior space between said panes and inside said spacer, and said spacer having therethrough a passage affording gas flow into and out of said space, stacking said glass assemblies one on top of another to provide an uppermost assembly and at least one supporting assembly beneath said uppermost assembly, with said panes extending generally horizontally and with a pane of each supporting assembly supporting a pane of an adjacent assembly, placing said glass assemblies in a chamber, creating a vacuum in said chamber so as to remove substantially all of the air from said spaces, introducing into said chamber a gas having a coefficient of thermal conductivity lower than that of air so that said gas fills said spaces, removing said glass assemblies from said chamber, and closing said passages in said glass assemblies.

2. A method as set forth in claim 1 wherein said spacer includes an inner wall partially defining said space and having therein a plurality of perforations, and an outer wall spaced from said inner wall and having therein an opening, said opening having an area substantially greater than the area of any one of said perforations, and wherein said passage includes said perforations and said opening.

3. A method as set forth in claim 1 wherein said spacer includes a longitudinal axis, an inner wall partially defining said space and having therein a first opening, and an outer wall spaced from said inner wall and having therein a second opening spaced in the direction of said longitudinal axis from said first opening, and wherein said passage includes said first and second openings.

4. A method as set forth in claim 3 wherein said second opening has an area substantially equal to the area of said first opening.

5. A method as set forth in claim 1 wherein said passage is tortuous.

6. A method for fabricating a plurality of insulating glass assemblies, said method comprising the steps of providing a plurality of glass assemblies each including a pair of generally parallel, spaced glass panes having therebetween an endless spacer, said spacer and said panes defining an interior space between said panes and inside said spacer, said spacer having therethrough a tortuous passage affording gas flow into and out of said space, placing said glass assemblies in a chamber with said tortuous passages being open, creating a vacuum in said chamber so as to remove substantially all of the air from said spaces via said tortuous passages, introducing into said chamber a gas having a coefficient of thermal conductivity lower than that of air so that said gas fills said spaces via said tortuous passages, removing said glass assemblies from said chamber, and closing said tortuous passages in said spacers.

7. A method for fabricating a plurality of insulating glass assemblies, said method comprising the steps of assembling a stack of glass assemblies each including a pair of generally parallel, spaced glass panes having therebetween an endless spacer, said spacer and said panes defining, between said panes, an interior space inside said spacer and an endless channel outside said spacer, and said spacer having therethrough a passage affording gas flow into and out of said space, arranging said glass assemblies one on top of another to provide a stack including an uppermost assembly and at least one supporting assembly beneath said uppermost assembly, with said panes extending generally horizontally and with a pane of each supporting assembly supporting a pane of an adjacent assembly, moving said stack into a chamber, creating a vacuum in said chamber so as to remove substantially all of the air from said spaces, introducing into said chamber a gas having a coefficient of thermal conductivity lower than that of air so that said gas fills said spaces, moving said stack out of said chamber, closing said passages while said glass assemblies remain in said stack, and filling said channels with a sealant while said glass assemblies remain in said stack.

8. A method as set forth in claim 7 wherein said spacer includes an inner wall partially defining said space and having therein a plurality of perforations, and an outer wall spaced from said inner wall and having therein an opening, said opening having an area substantially greater than the area of any one of said perforations, and wherein said passage includes said perforations and said opening.

9. A method as set forth in claim 7 wherein said spacer includes a longitudinal axis, an inner wall partially defining said space and having therein a first opening, and an outer wall spaced from said inner wall and having therein a second opening spaced in the direction of said longitudinal axis from said first opening, and wherein said passage includes said first and second openings.

10. A method as set forth in claim 9 wherein said second opening has an area substantially equal to the area of said first opening.

11. A method as set forth in claim 7 wherein said passage is tortuous.

12. A method for fabricating a plurality of insulating glass assemblies, said method comprising the steps of providing a plurality of glass assemblies each including a pair of generally parallel, spaced glass panes having therebetween an endless spacer, said spacer and said panes defining an interior space between said panes and inside said spacer, said spacer including an inner wall partially defining said interior space and having therein a plurality of perforations, and an outer wall spaced from said inner wall and having therein an opening, said opening having an area substantially greater than the area of any one of said perforations, and said spacer having therethrough a tortuous passage including said perforations and said opening and affording gas flow into and out of said space, placing said glass assemblies in a chamber, creating a vacuum in said chamber so as to remove substantially all of the air from said spaces, introducing into said chamber a gas having a coefficient of thermal conductivity lower than that of air so that said gas fills said spaces, removing said glass assemblies from said chamber, and closing said passages in said spacers.

13. A method for fabricating a plurality of insulating glass assemblies, said method comprising the steps of providing a plurality of glass assemblies each including a pair of generally parallel, spaced glass panes having therebetween an endless spacer, said spacer and said panes defining an interior space between said panes and inside said spacer, said spacer including a longitudinal axis, an inner wall partially defining said space and having therein a first opening, and an outer wall spaced from said inner wall and having therein a second opening spaced in the direction of said longitudinal axis from said first opening, and said spacer having therethrough a tortuous passage therethrough including said first and second openings and affording gas flow into and out of said space, placing said glass assemblies in a chamber creating a vacuum in said chamber so as to remove substantially all of the air from said spaces, introducing into said chamber a gas having a coefficient of thermal conductivity lower than that of air so that said gas fill said spaces, removing said glass assemblies from said chamber, and closing said passages in said spacers.

14. A method as set forth in claim 13 wherein said second opening has an area substantially equal to the area of said first opening.

15. A method for fabricating a plurality of insulating glass assemblies, said method comprising the steps of providing a plurality of glass assemblies each including a pair of generally parallel, spaced glass panes having therebetween an endless spacer, said spacer and said panes defining an interior space between said panes and inside of said spacer, and said spacer having therethrough a passage affording gas flow into and out of said space, stacking said glass assemblies one on top of another to provide an uppermost assembly and at least one supporting assembly beneath said uppermost assembly, with said panes extending generally horizontally and with a pane of each supporting assembly supporting the pane of an adjacent assembly, placing said glass assemblies in a chamber, creating a vacuum in said chamber so as to remove substantially all of the air from said spaces, introducing into said chamber a gas having a coefficient of thermal conductivity lower than that of air so that said gas fills said spaces, said creating and introducing steps being performed without applying vertical pressure to said glass assemblies, removing said glass assemblies from said chamber, and closing said passages in said glass assemblies.

16. A method as set forth in claim 15 wherein said providing step further includes the provision of an adhesive sealant between each one of said pair of panes and said spacer.

* * * * *